US010385925B2

(12) United States Patent
Jansen et al.

(10) Patent No.: US 10,385,925 B2
(45) Date of Patent: Aug. 20, 2019

(54) CLUTCH HUB

(71) Applicants: SIEMENS AKTIENGESELLSCHAFT, München (DE); VEM Sachsenwerk GmbH, Dresden (DE)

(72) Inventors: Andre Jansen, Borken (DE); Jens Proske, Dresden (DE)

(73) Assignee: Flender GmbH, Bocholt (DE)

( * ) Notice: Subject to any disclaimer, the term of this patent is extended or adjusted under 35 U.S.C. 154(b) by 627 days.

(21) Appl. No.: 14/894,436

(22) PCT Filed: May 9, 2014

(86) PCT No.: PCT/EP2014/059542
§ 371 (c)(1),
(2) Date: Nov. 27, 2015

(87) PCT Pub. No.: WO2014/191182
PCT Pub. Date: Dec. 4, 2014

(65) Prior Publication Data
US 2016/0131195 A1 May 12, 2016

(30) Foreign Application Priority Data
May 29, 2013 (DE) .................. 10 2013 210 076

(51) Int. Cl.
*F16D 1/076* (2006.01)
*F16D 1/05* (2006.01)
(Continued)

(52) U.S. Cl.
CPC .............. *F16D 1/05* (2013.01); *F16D 1/02* (2013.01); *F16D 1/076* (2013.01); *F16D 1/08* (2013.01);
(Continued)

(58) Field of Classification Search
CPC ... F16D 1/02; F16D 1/033; F16D 1/04; F16D 1/076; F16D 1/00; F16D 1/06; F16D 1/08;
(Continued)

(56) References Cited
U.S. PATENT DOCUMENTS 3,138,226 A * 6/1964 Howe ................. B23Q 3/086
269/7
3,250,553 A 5/1966 Detwiler
(Continued)

FOREIGN PATENT DOCUMENTS

CN 2389250 Y 7/2000
CN 101070881 A 11/2007
(Continued)

*Primary Examiner* — Michael P Ferguson
(74) *Attorney, Agent, or Firm* — Henry M. Feiereisen LLC

(57) ABSTRACT

The invention relates to a clutch hub. The clutch hub (1) comprises a hub body (2) with an axial passage opening (4) for receiving a shaft (5) and with in each case one face side (3a, 3b) at the two axial ends of the passage opening (4). An internal surface (6) is formed in the passage opening (4), and a flat surface (7a, 7b) annularly surrounding the passage opening (4) is formed on each of the face sides (3a, 3b). The internal surface (6) is covered by an electrical insulation coating (8) in the form of a ceramic coating. The electrical insulation coating (8) also, in continuous fashion, covers a respective annular region (9a, 9b), surrounding the passage opening (4), on the flat surfaces (7a, 7b) and a transition region (10a, 10b) formed between the internal surface (6) and the respective annular region (9a 9b).

15 Claims, 6 Drawing Sheets

(51) Int. Cl.
*F16D 1/02* (2006.01)
*F16D 1/08* (2006.01)
*F16D 1/09* (2006.01)
*F16D 3/72* (2006.01)

(52) U.S. Cl.
CPC .............. *F16D 1/0858* (2013.01); *F16D 1/09* (2013.01); *F16D 3/72* (2013.01); *F16D 2001/0906* (2013.01); *F16D 2200/0039* (2013.01); *F16D 2250/0046* (2013.01); *F16D 2300/06* (2013.01); *F16D 2300/12* (2013.01)

(58) Field of Classification Search
CPC . F16D 1/12; F16D 3/00; Y10T 403/64; Y10T 403/645
See application file for complete search history.

(56) References Cited

U.S. PATENT DOCUMENTS

| | | | | |
|---|---|---|---|---|
| 3,363,918 | A * | 1/1968 | Fisher | F16L 27/108 138/132 |
| 3,457,438 | A * | 7/1969 | Badcock | F16D 3/50 310/50 |
| 3,500,660 | A * | 3/1970 | Anderson | F16D 1/076 403/336 |
| 4,083,639 | A * | 4/1978 | Terry | F16D 1/0876 403/16 |
| 4,211,192 | A * | 7/1980 | Baumgartner | B23P 11/022 123/90.6 |
| 4,407,602 | A * | 10/1983 | Terry, Jr. | F16D 1/06 403/336 |
| 5,888,140 | A * | 3/1999 | Klingler | F16D 3/72 411/339 |
| 6,116,397 | A | 9/2000 | Kosumi et al. | |
| 6,471,594 | B2 | 10/2002 | Scheithauer et al. | |
| 7,530,757 | B2 * | 5/2009 | Toda | C23C 4/00 403/23 |
| 8,900,061 | B2 | 12/2014 | Jansen et al. | |
| 2011/0311304 | A1 | 12/2011 | Graham et al. | |
| 2011/0311305 | A1 | 12/2011 | Cairo | |

FOREIGN PATENT DOCUMENTS

| | | | | |
|---|---|---|---|---|
| CN | 101140015 A | | 3/2008 | |
| CN | 101668959 A | | 3/2010 | |
| DE | 27 03 795 | * | 8/1977 | ............... F16D 1/08 |
| DE | 3933825 A1 | | 4/1990 | |
| DE | 102007036001 B4 | | 5/2011 | |
| FR | 1416309 A | | 11/1965 | |
| GB | 824931 | * | 12/1959 | ............. F16D 1/033 |
| GB | 2197431 A | | 5/1988 | |
| WO | WO 2009/052825 | * | 4/2009 | ............. F16D 1/033 |

* cited by examiner

CLUTCH HUB

CROSS-REFERENCES TO RELATED APPLICATIONS

This application is the U.S. National Stage of International Application No. PCT/EP2014/059542, filed May 9, 2014, which designated the United States and has been published as International Publication No. WO 2014/191182 and which claims the priority of German Patent Application, Serial No. 10 2013 210 076.0, filed May 29, 2013, pursuant to 35 U.S.C.119(a)-(d).

BACKGROUND OF THE INVENTION

The present invention relates to a clutch hub and a clutch device.

DE 102007036001 B4 (VOITH PATENT GMBH) Feb. 19, 2009 describes an electrically-insulating shaft connection element for establishing electrical insulation between the drive system of a rail vehicle and a section of track. The shaft connection element comprises an outer shaft element with an internal opening in which an inner surface is embodied, as well as an inner shaft element with an outer surface, which is inserted into the internal opening of the outer shaft element by means of an interference fit. The inner surface of the outer shaft element and/or the outer surface of the inner shaft element have an electrical insulation coating, which insulates the outer and the inner shaft element electrically from each other. In this case the inner shaft element has an internal opening for connection to further shaft components.

SUMMARY OF THE INVENTION

The object of the present invention is to provide an improved clutch.

The object is achieved, in accordance with the invention, by a clutch hub including a hub body. The hub body has an axial passage opening for receiving a shaft. A face side is located at each of the two axial ends of the passage opening. An inner surface is embodied in the passage opening. Also embodied on the face sides is a flat surface, surrounding the passage opening in an annular fashion in each case. In this case the inner surface is covered by an electrical insulation coating embodied as a ceramic coating. Furthermore the electrical insulation coating continuously covers an annular region surrounding the passage opening in each case on the flat surfaces and a transition region formed between the inner surface and the respective annular region.

The invention is based on the knowledge that, with the previously known electrically-insulating shaft connection elements, an electrical flashover between the components electrically insulated from one another in the edge region of the insulating region is not prevented, since the distance between the components, which are at different electrical potentials, is essentially predetermined by the coating thickness of the insulating coating—the typical coating thickness is less than 2 mm—and is therefore relatively small. In accordance with the invention the distance between the components which are at different electrical potential is increased by the electrical insulation coating, except for the inner surface of the passage opening of the clutch hub, still continuously covering in each case an annular region surrounding the passage opening on the flat surfaces and a transition region formed between the inner surface and the respective annular region.

The inventive clutch hub is able to be used in all clutches between motors and transmissions, especially for all converter-fed electrical drives, including in traction drives, especially with single-bearing motors. Above all this offers advantages in the delivery of complete drive units, i.e. drive units including motor and transmission. A preferred application of the clutch hub is in an electrically-insulating clutch between the drive system of a rail vehicle and a section of track.

Trials have surprisingly shown that the insulation coating does not have to be protected by an additional clutch component from torque loads arising at the interface between shaft and clutch hub, which is disposed between the insulation coating and the shaft. Unlike previously known clutch hubs, the insulation coating is in direct contact with the shaft. Thus an additional hub component to protect the insulation coating is dispensed with, which was previously deemed indispensible in accordance with received wisdom of those skilled in the art in order to prevent damage to the insulation coating, such as brittle fracture.

Advantageous embodiments and developments of the invention are specified in the dependent claims. In such cases the inventive method can also be developed in accordance with the dependent device claims, and vice versa.

The ceramic coating can comprise one or more of the following ceramics: Aluminum oxide, Magnesium oxide, Zirconium oxide, Titanium oxide, Aluminum titanate, Silicon carbine, Boron carbide, Silicon nitride, Aluminum nitride or Boron nitride. The hub body can consist of a metallic material, e.g. iron or steel. As an alternative composite materials can also be provided.

A ceramic coating can be applied as a slip, as is known from enamel manufacturing. It is also possible for the ceramic insulation coating to be applied to the surfaces of the clutch hub to be coated by a thermal spraying method, such as flame or plasma spraying.

In accordance with a preferred embodiment of the invention the insulation coating has an even coating thickness. In particular the coating thickness is formed largely evenly by abrasion. The coating thickness of the insulation coating preferably lies in a range of 0.1 to 1 mm, especially in range of 0.2 mm. This thickness offers an advantageous compromise between flashover resistance, use of, material and withstanding the loads occurring, especially application of torques, during operation of the clutch hub. The coating thickness actually used depends on the requirements for electrical resistance and impedance and is selected as a function of the voltages and capacitive discharge currents to be selected.

In accordance with a preferred embodiment of the invention the transition embodied between the inner surface and the respective annular region has a radius of curvature ranging from 0.2 to 5 mm, especially ranging from 1 to 3 mm, further especially of around 2 mm. Trials have shown that an especially stable coating can be formed in the curved transition region if the radius of curvature lies in this range.

In accordance with a preferred embodiment of the invention the clutch hub has an oil channel, which begins at one of the face sides and emerges in the inner surface. Preferably the oil channel is embodied by holes in the clutch hub. In its face-side entry section the oil channel can have an inner thread, into which a threaded sleeve of a hydraulic oil line can be screwed. The oil channel enables oil under pressure to be forced between the inner surface and the corresponding contact surface of a shaft; in this way installation of a shaft in the passage opening of the clutch hub or removal of the shaft can be facilitated, for maintenance purposes for example. In addition a radial circumferential gutter can be embodied at the mouth of the channel in the inner surface. The advantage of this is that oil forced in can be distributed over the entire circumference of the corresponding contact surfaces of inner surface and shaft by the gutter.

In accordance with a preferred embodiment of the invention the passage opening is designed as a N-times stepped hole, wherein N is a number greater than one. The advantage of this is that the stepped hole makes it easier for the clutch hub to be pushed onto a correspondingly stepped shaft, since the sections of the clutch hub with the greatest internal diameter are initially pushed over the shaft sections with the smallest external diameter. This means that an automatic and successively more exact centering takes place.

In accordance with a preferred embodiment of the invention the passage opening is designed in the shape of a cone or a cylinder. An interference fit with conical components, i.e. a conical interference fit, offers the advantage of easier dismantling. An interference fit with cylindrical components offers the advantage of no axial forces being introduced into the interference fit.

A preferred embodiment of the invention is a clutch device with two clutch halves connected to one another in a rotationally-rigid fashion, wherein the clutch device has a metal membrane and at least one of the two clutch halves is a clutch hub as described above.

An inventive clutch device allows electrical insulation between the rotor of an electric machine and the shaft of a directly-coupled reduction transmission running at high speed by means of the insulated clutch hub, whose task it is to prevent electrical continuity from the motor rotor through the transmission, especially to avoid damage to bearings.

In addition the electrically-insulated clutch hub allows simple testing of the single-bearing motors for intact rotor insulation, i.e. of bearings and clutch hub when coated bearings are used, or of other bearing insulation and non-insulated auxiliary bearings during automatic routine testing of the machines. Alongside this it is possible in the simplest manner to test the insulation resistance of the motor rotor as part of the maintenance of vehicles in the installed state.

The inventive clutch device, because of its compactness and robustness, is especially suitable for single-bearing traction motors, but is not restricted to this application. The inventive clutch device thus meets the customer's desire for drive units which are suitable for connection to fast-switching voltage converters (U-converters). The inventive clutch device protects the transmission against damaging capacitive discharge currents as a result of bearing voltages caused by the converters, especially in compact traction drives.

In such cases it is preferred that the clutch halves be connected by face splines. This produces an especially rotationally-rigid clutch.

It is possible to connect an inventive clutch hub to a shaft in an interference fit, wherein the heated clutch hub is pushed onto the non-heated shaft. Trials have shown that, contrary to received wisdom, heating the coated clutch hub does not lead to any damage, especially stress fractures, in the coating, especially in a ceramic coating. For this purpose the coated clutch hub is heated to a temperature of around 200° C. for example, e.g. with the aid of an induction device, while the shaft is at room temperature, e.g. at 20° C.

In an alternate embodiment the clutch device has two clutch halves connected to one another, which are each disposed on one end of the shaft. In this case at least one of the two shaft ends bears a coating, which electrically insulates the shaft end and the corresponding clutch half. The coating here, as well as being disposed on the contact surface of shaft end and clutch half, is also disposed in the annular regions adjoining the contact surface on the shaft end. Thus a flashover between the shaft and a clutch hub installed thereon is prevented by a face-side lengthening of the flashover path, in that the electrical insulation coating, as well as covering the contact surface of the clutch hub and the shaft, also continuously covers the two annular regions surrounding the contact surface on the shaft circumference or the shaft end face.

BRIEF DESCRIPTION OF THE DRAWING

The invention is explained below with reference to the enclosed drawings. In the figures, schematically and not true-to-scale.

DETAILED DESCRIPTION OF PREFERRED EMBODIMENTS

Figure 1:
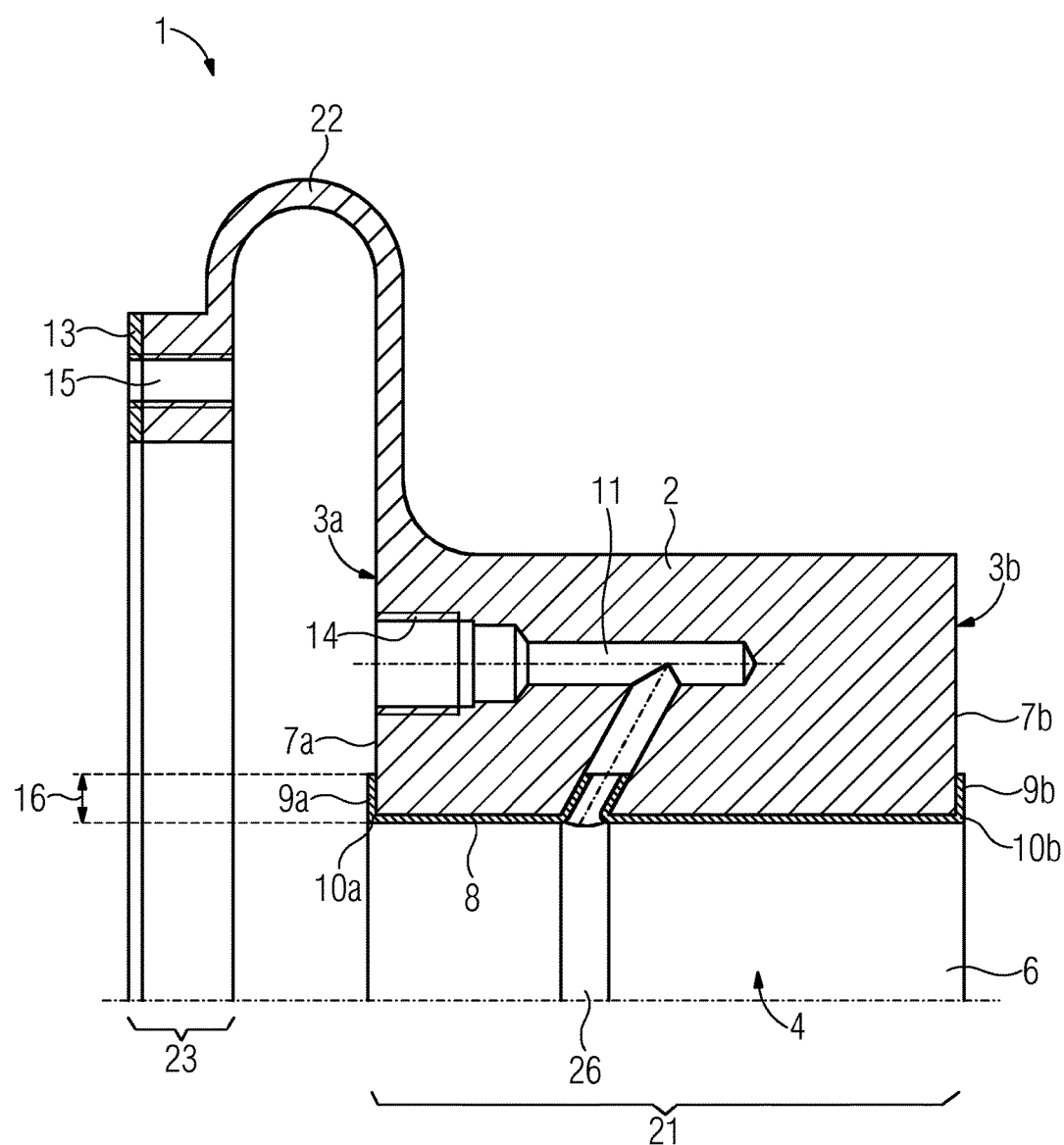
FIG. 1 shows a first exemplary embodiment of a clutch hub.

FIG. 1 shows a clutch hub 1 with a hub body 2. The hub body molded in one piece has a shaft section 21 for receiving a shaft, an axially-yielding metal membrane 22 and a screw section 23 with holes 16 and face splines 13 for connection to a further clutch element. The hub body 2 has a cylindrical passage opening 4 in the shaft section 21, which extends in an axial direction through the hub body 2. The passage opening 4 serves to receive a shaft. The hub body 2 also has a face side 3a, 3b at each of the two axial ends of the passage opening 4. Embodied in the passage opening 4 is an internal surface 6.

Embodied in the hub body 2 is an oil channel 11, which begins on the left face side 3a and emerges in the inner surface 5. The oil channel 11 is embodied by two holes in the hub body 2 running at an angle to one another. In its face-side 3a entry section the oil channel 11 has an internal thread 14, into which a threaded sleeve of a hydraulic oil pressure line can be screwed. The oil channel 11 enables oil to be forced under pressure between the inner surface 6 and a corresponding circumferential surface of a shaft; in this way installation of a shaft in the passage opening 4 of the clutch hub 1 or removal of the shaft can be facilitated, e.g. for maintenance purposes. At the mouth of the oil channel 11 in the inner surface 6 the passage opening has a gutter 26 running radially. Oil forced in through the oil channel 11 can be distributed via the gutter 26 over the entire circumference of the inner surface 6 and thus facilitate the installation and removal of a shaft (oil interference fit).

In order to avoid a current flashover in the region of the mouth of the oil channel 11 into the inner surface 4, as well as the inner surface 4, the wall of the oil channel 11 adjoining the inner surface 4 is also coated with the electrically-insulating coating. It is of advantage to sufficiently coat the oil channel as far as possible into the interior of the hub, since this enlarges the flashover path and thus the flashover resistance. When the coating is applied it must be insured that the coating in the oil channel 11 does not close off said channel.

An alternative to an electrically-insulating coating of the wall of the oil channel 11 is to route the oil channel into the shaft, e.g. the motor shaft, or to dispose the insulation coating on the shaft, e.g. the motor shaft.

Embodied on the two face sides 3a, 3b in each case is a flat surface 7a, 7b surrounding the passage opening 4 in an annular shape. The inner surface 6, a ring 9a, 9b on the flat surfaces 7a, 7b surrounding the passage opening 4 in each case and a respective transition region 10a, 10b formed in each case between the inner surface 6 and the ring 9a, 9b are continuously covered by an electrically-insulating coating 8.

Figure 2:
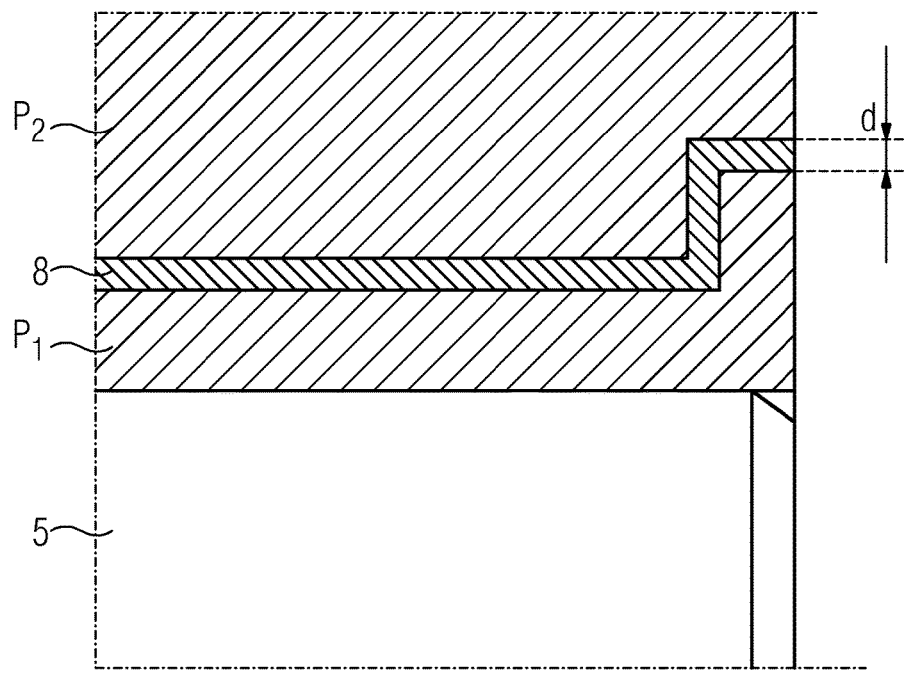
FIG. 2 shows an edge region of an insulation coating for previously known clutch hubs.
Figure 3:
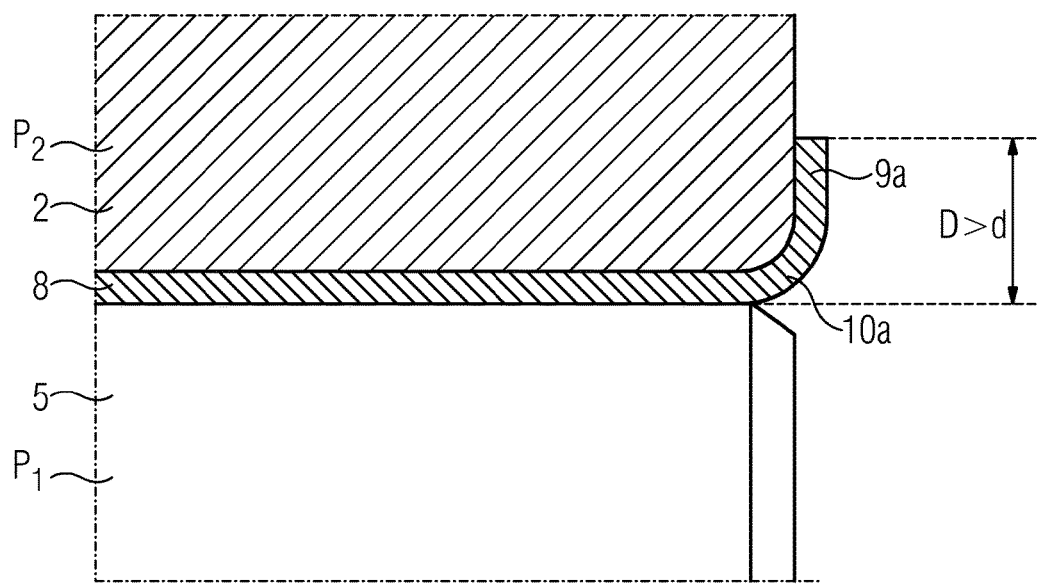
FIG. 3 shows an edge region of an insulation coating for an inventive clutch hub.

The coating thickness of the electrically-insulating coating 8 lies in a range of 0.2 mm. The ring width 16 of the rings 9a, 9b on the flat surfaces 7a, 7b on the two face sides of the hub body 2 lies in a range of at least 1 mm, preferably in a range of 2 to 3 mm. The ring width 16 is selected as a function of a maximum flashover voltage to be expected. The greater the ring width 16 selected, the smaller is an electrical flashover between the hub body 2 and a shaft, because of the lengthening of the creepage path. FIG. 2 and FIG. 3 illustrate this state of affairs.

FIG. 2 shows an edge region of an insulation coating 8 in previously known clutch hubs. The insulation coating, which is disposed between two hub components at different electrical potentials P1 and P2, has a coating thickness d, which corresponds to the flashover path. In the present example the clutch hub has two elements, wherein the element at the potential P1 is an inner hub element immediately surrounding the shaft 5 and the element at the potential P2 is an outer hub element. The insulation coating 8 is enclosed between the two hub elements to protect it from damage. An electrical flashover between two hub elements at the face side will not be reliably prevented, since the distance between the components, which are at different electrical potential P1 and P2, is predetermined by the coating thickness d of the insulation coating and is therefore relatively small.

FIG. 3 illustrates the inventive solution to this problem: The distance D between the components which are at different electrical potential P1 and P2, i.e. the flashover path between the clutch hub 2 and a shaft 5 on the face side of the clutch hub, is enlarged (D>d) by the electrical insulation coating 8 also continuously covering an annular region 9a surrounding the passage opening on the flat surfaces and a transition region 10a formed between the inner surface and the respective annular region.

Figure 4:
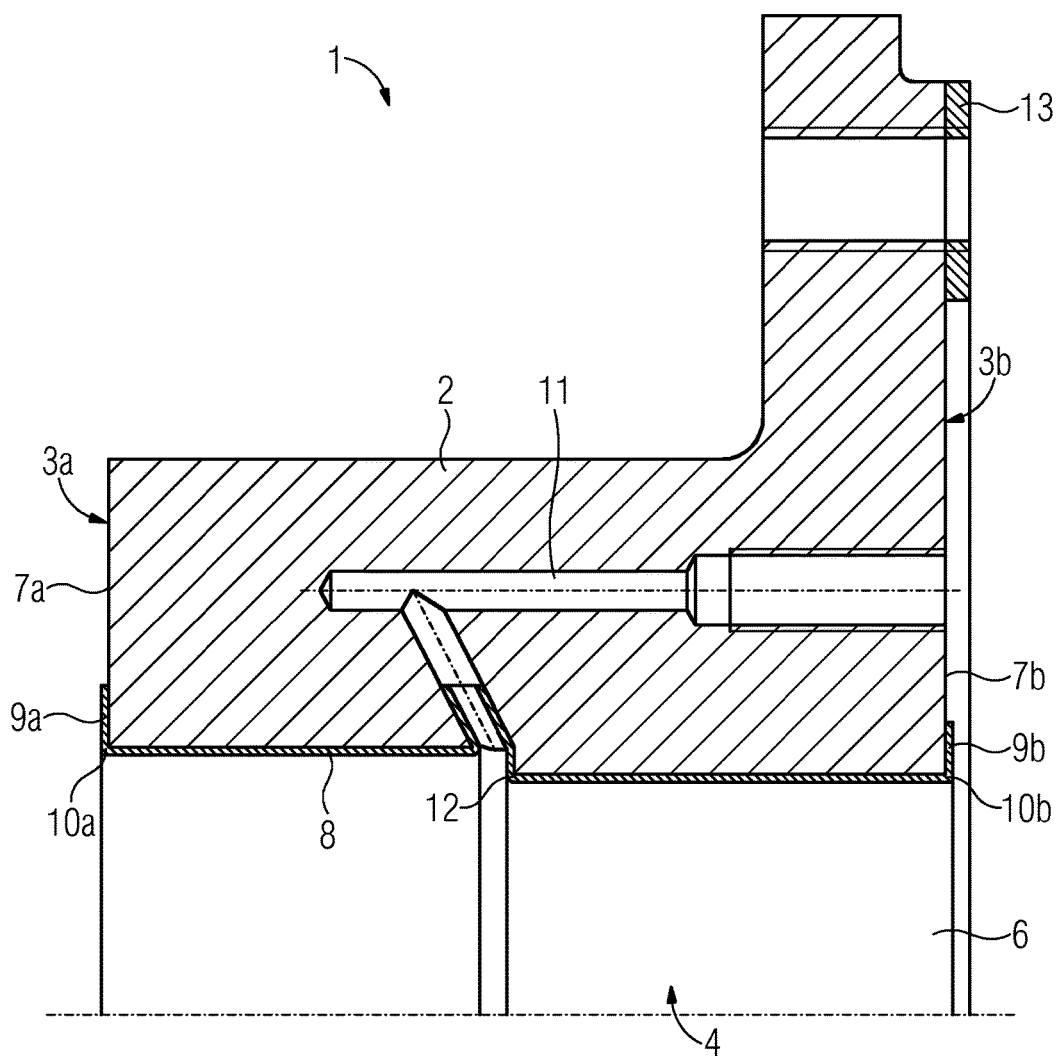
FIG. 4 shows a further exemplary embodiment of a clutch hub.
Figure 5:
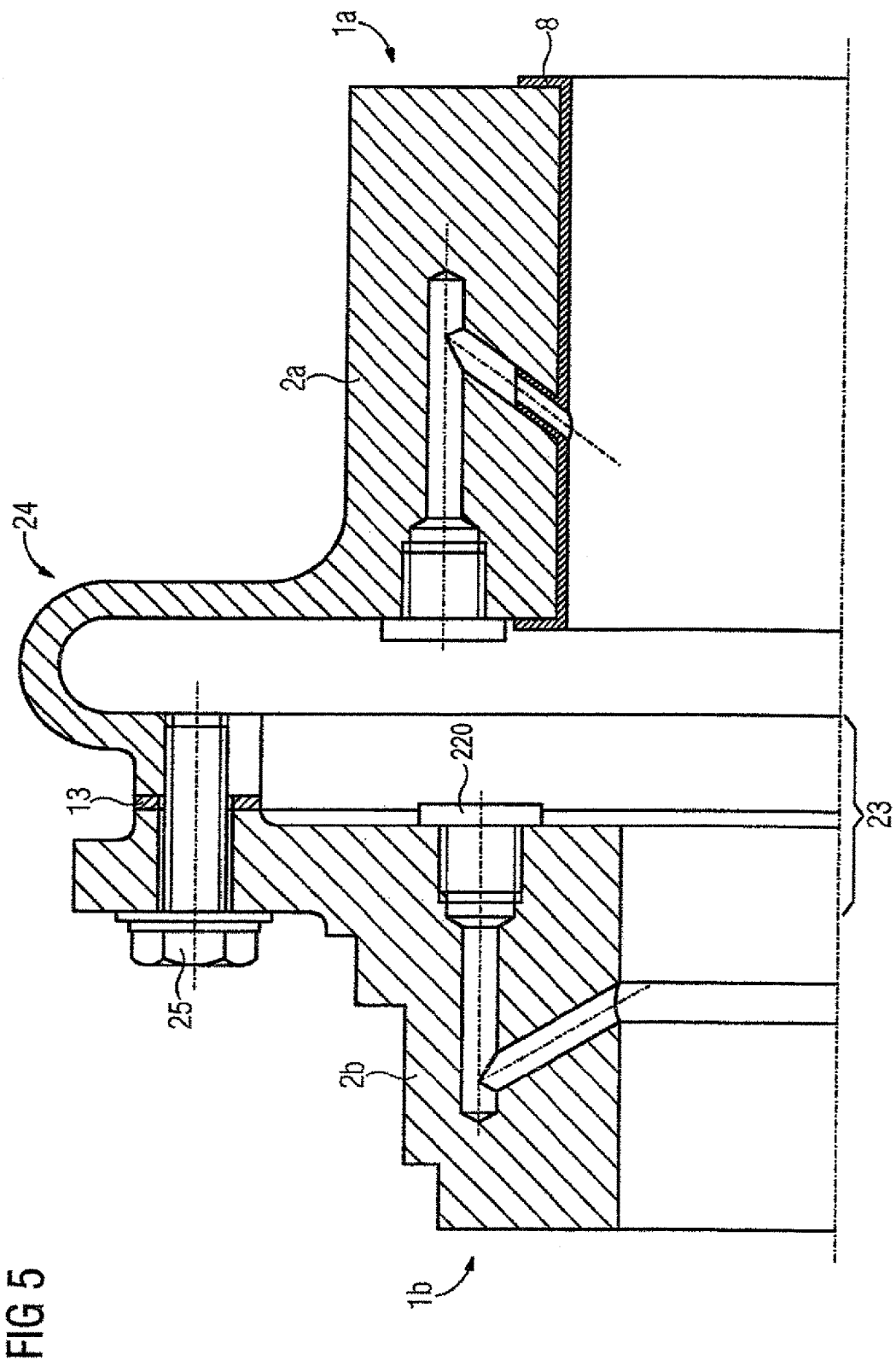
FIG. 5 shows a clutch device with two clutch halves.

FIG. 4 shows a second clutch hub 1 which is able to be installed on the first clutch hub according to FIG. 1; the clutch produced thereby is a rotationally-rigid membrane clutch, as is shown in FIG. 5. The insulation coating 8 can be applied to the first clutch hub 1 according to FIG. 1 and/or to the second clutch hub 1 according to FIG. 4. The second clutch hub 1 depicted in FIG. 4 differs from the first clutch hub depicted in FIG. 1 in that it does not have a metal membrane and that its passage opening 4 is embodied as a stepped hole with a step 12.

FIG. 5 shows a two-part, rotationally-rigid clutch device 24, which has been formed from a combination of a hub body 2a according to FIG. 1 and a hub body 2b according to FIG. 4, wherein the insulation coating 8 is applied to the inner surface of the right-hand hub body 2a.

Such a membrane clutch 24, preferably designed as a completely steel clutch, has high run-out accuracies and an extremely high balancing quality, since they can be balanced together with the motor rotor. Run-out accuracy and balancing quality are retained permanently by the optimal centering of the face splines 13 of the two clutch halves 1a and 1b. Such clutches are also practically maintenance-free.

Because of their membrane contour 220 such membrane clutches 24 are capable of yielding axially. A simple disconnection or connection of motor and transmission via the screwing of the two clutch halves 1a, 1b in a screw section 23 by means of screws 25 is possible without releasing the interference fits. Such membrane clutches 24 are maintenance-free and serve to transmit the torque and to support the motor shaft in the transmission. The membrane clutches 24 preferably embodied as completely steel clutches only allow a small shaft offset, The membrane clutches are preferably used in streetcars and low floor streetcars.

The good concentricity of the clutch also allows retrofitting of the insulation coating 8.

Figure 6:
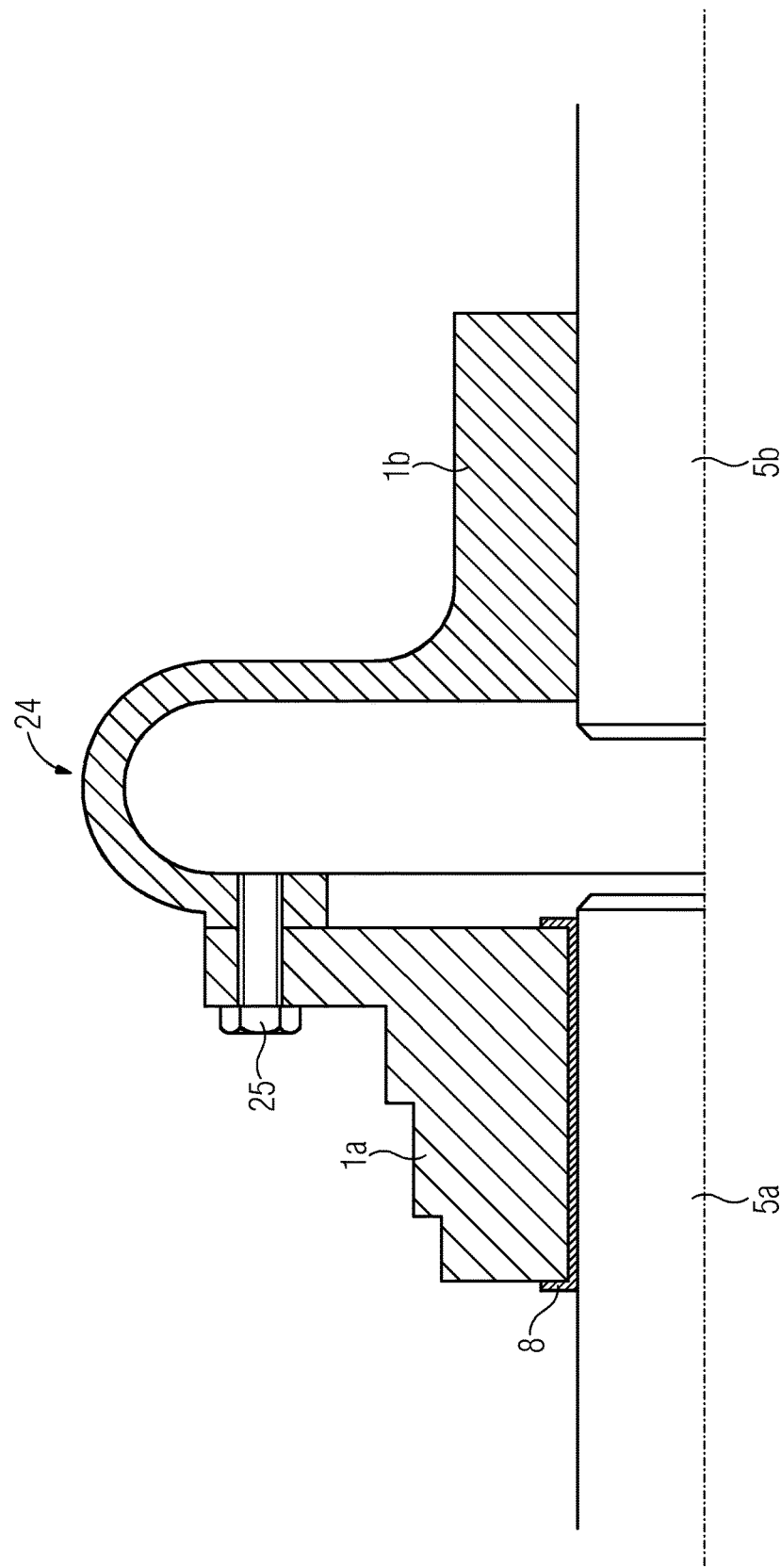
FIG. 6 shows a clutch device in accordance with FIG. 5, which establishes a rotationally-rigid connection between two shafts.

FIG. 6 shows a clutch device 24 according to FIG. 5, which connects two shafts 5a and 5b. The first shaft 5a is a motor shaft, the second shaft 5b is a transmission shaft. The clutch device comprises two clutch halves 1a and 1b screwed to each other with screws 25, which are fastened in an interference fit onto the shafts 5a and 5b. In accordance with the invention at least one of the clutch halves 1a and 1b has an electrical insulation coating between the clutch hub and the shaft. In the present exemplary embodiment the insulation coating 8 is disposed on the left-hand clutch half 1a, i.e. at the interface between the clutch 24 and the motor shaft 5a.

Figure 7:
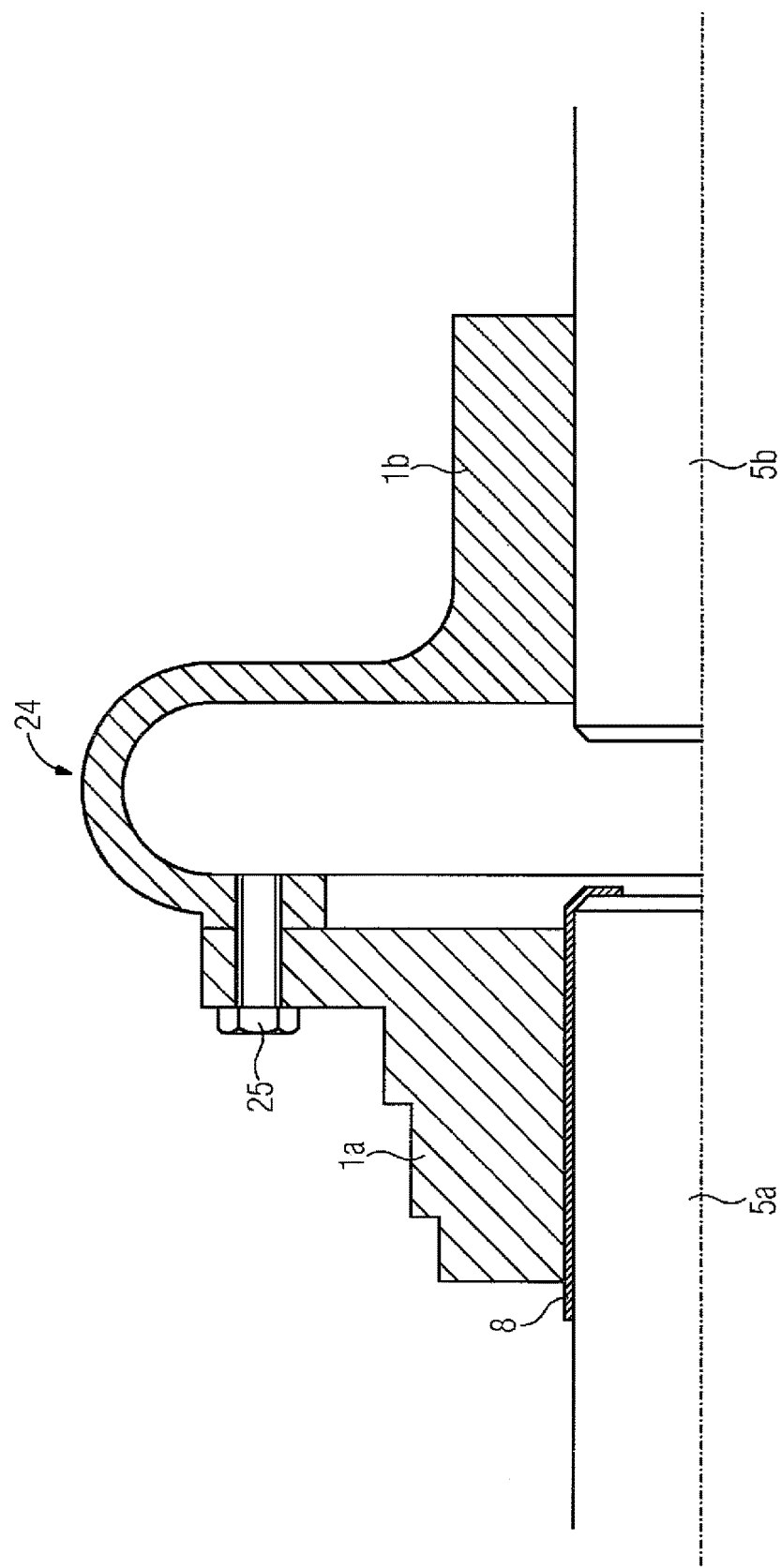
FIG. 7 shows an alternate embodiment of the clutch device shown in FIG. 6.

FIG. 7 shows an alternate embodiment of the clutch device 24 as shown in FIG. 6. The clutch device 24 in this case, as in FIG. 6, has two clutch halves 1a, 1b connected to one another, which are each disposed on one shaft end 5a, 5b. In this case one of the two shaft ends 5a bears a coating 8, which electrically insulates the shaft end 5a and the hub body of the corresponding clutch half 1a. The coating here is also disposed, as well as in the region of the contact surface, between shaft end 5a and hub body of the clutch half 1a, i.e. the contact region of the hub body on the shaft 5a, in the annular regions on the shaft end 5a adjacent to the contact surface.

The annular region of the coating on the left in FIG. 7 is embodied in the form of a cylinder jacket. The annular region of the coating on the right in FIG. 7 is embodied in the form of a quarter torus, wherein the coating extends from the circumference of the shaft via the face-side chamfer to the face side of the shaft end.

The annular regions enlarging the flashover path are thus disposed according to FIG. 7 on the shaft 5a, by contrast with the embodiment according to FIG. 6, in which the annular regions enlarging the flashover path are disposed on the clutch hub.

Although the invention has been illustrated in greater detail and described by the preferred exemplary embodiments, the invention is not restricted by the disclosed examples.

What is claimed is:
1. A clutch hub, comprising:
a cylindrical hub body configured for a rigid connection to a hub body of another clutch hub, said hub body having two opposing axial ends, each axial end defining a radially-extending face side, said hub body having an axial passage opening extending therethrough between the two axial ends for receiving a shaft therein, and having an inner cylindrical surface, each said face side forming a flat surface which annularly surrounds the passage opening;

an annular flange disposed on one of the axial ends of the hub body, said flange having radially-extending face splines disposed on an axial face thereof configured to engage with opposing face splines on a respective flange of the hub body of the other clutch hub; and an angled oil channel extending from the annular flat surface of the one of the face sides adjacent said flange to the inner cylindrical surface of the passage opening for receiving pressurized oil to facilitate insertion and removal of a shaft within the passage opening; and an electrically-insulating ceramic coating substantially covering the inner cylindrical surface of the passage opening and continuously covering an annular region on the annular flat surface of each said face side and a transition region formed between the inner cylindrical surface and the annular region, said oil channel extending through the coating so as to be in communication with the passage opening, and the coating extending into an entry of the oil channel from the passage opening.

2. The clutch hub of claim 1, wherein the transition region has a radius of curvature in a range of 0.2 to 5 mm.

3. The clutch hub of claim 1, wherein the transition region has a radius of curvature in a range of 1 to 3 mm.

4. The clutch hub of claim 1, wherein the transition region has a radius of curvature of around 2 mm.

5. The clutch hub of claim 1, wherein the passage opening has a conical or cylindrical shape.

6. The clutch hub of claim 1, wherein the electrically-insulating coating has an even coating thickness.

7. The clutch hub of claim 6, wherein the coating thickness is in a range of 0.2 mm.

8. The clutch hub of claim 1, and further comprising a metal membrane structured to be axially yielding and formed with the hub body.

9. The clutch hub of claim 8, wherein the metal membrane is formed in one piece with the hub body.

10. The clutch hub of claim 8, wherein the metal membrane extends radially outwards in a dome-shaped manner from the hub body and configured to enable the connection to the hub body of the other clutch hub.

11. A clutch device, comprising:
two clutch hubs which are connected to one another via a rigid connection, each of the two clutch hubs comprising:
a cylindrical hub body having two opposing axial ends, each axial end defining a radially-extending face side, said hub body having an axial passage opening extending therethrough between the two axial ends for receiving a shaft therein, and having an inner cylindrical surface, each said face side forming a flat surface which annularly surrounds the passage opening:

an annular flange disposed on one of the axial ends of the hub body, said flange having radially-extending face splines disposed on an axial face thereof, wherein the two clutch hubs are rigidly connected via engagement of the opposing respective face splines thereof; and an angled oil channel extending from the annular flat surface of the one of the face sides adjacent said flange to the inner cylindrical surface of the passage opening for receiving pressurized oil to facilitate insertion and removal of a shaft within the passage opening; and said hub body of at least one of the two clutch hubs having an electrically-insulating ceramic coating substantially covering the inner cylindrical surface of the passage opening and continuously covering an annular region on the annular flat surface of each said face side and a transition region formed between the inner cylindrical surface and the annular region, said oil channel extending through the coating so as to be communication with the passage opening, and the coating extending into an entry of the oil channel from the passage opening.

12. The clutch device of claim 11, wherein the transition region has a radius of curvature in a range of 0.2 to 5 mm.

13. The clutch device of claim 11, wherein the passage opening has a conical or cylindrical shape.

14. The clutch device of claim 11, wherein the electrically-insulating coating has an even coating thickness.

15. The clutch device of claim 11, wherein one of the clutch hubs includes a metal membrane structured to be axially yielding and formed with the hub body.

* * * * *